July 29, 1969     O. DONALDSON     3,458,012
GUIDANCE APPARATUS FOR SUPPORTING A DEVICE IN CLOSE
PROXIMITY TO THE INNER WALL OF A TAPERED STACK
Filed Feb. 6, 1968
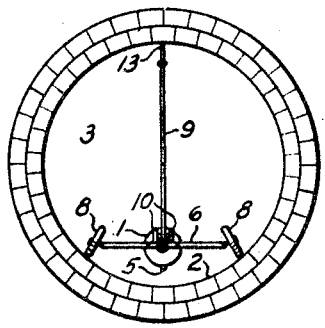
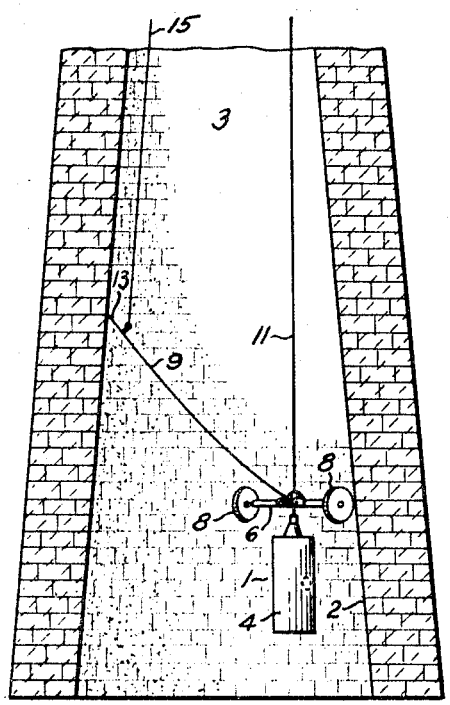
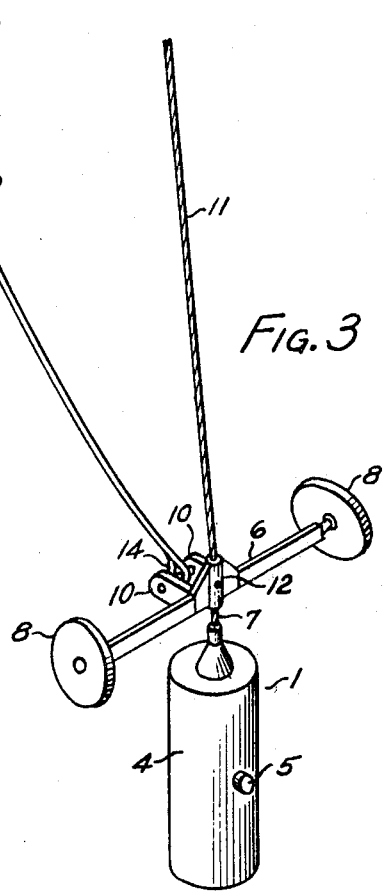
*INVENTOR*
*Orlin Donaldson*

3,458,012
GUIDANCE APPARATUS FOR SUPPORTING A DEVICE IN CLOSE PROXIMITY TO THE INNER WALL OF A TAPERED STACK
Orlin Donaldson, Bethlehem, Pa., assignor to Bethlehem Steel Corporation, a corporation of Delaware
Filed Feb. 6, 1968, Ser. No. 703,361
Int. Cl. B66b 9/00; G03b 19/00
U.S. Cl. 187—1                                3 Claims

ABSTRACT OF THE DISCLOSURE

Beam with wheels at both ends engaging inner wall of tapered stack supports device at center thereof. Thrust rod has one end pivotally mounted to beam center for rotation in a vertical plane, the other end of the thrust rod engaging opposite wall of stack at higher elevation than pivoted end to produce thrust forcing wheels of beam into continuous engagement with stack wall, thereby maintaining said device in close proximity to stack wall.

Background of the invention

This invention relates generally to guidance apparatus for supporting a device in close proximity to the inner wall of a tapered stack. More specifically, this invention relates to guidance apparatus for supporting a camera vehicle in close proximity to the inner wall of a tapered stack to permit photographs of said wall to be taken.

Other devices for supporting camera vehicles in tapered stacks for photographic purposes have been cumbersome and expensive, and otherwise not entirely satisfactory for a number of reasons. One such arrangement is shown in Blast Furnace and Steel Plant, June 1966, pp. 510–511. This arrangement employs a winch and a standoff pole, mounted on opposite sides of the stack top. Apparently no means are provided for maintaining the camera vehicle in close proximity to the stack wall.

The present invention represents a considerable improvement over prior art arrangements in that it permits the use of a single lowering cable and keeps the camera vehicle steady and in close proximity to the stack wall at all times when the device is in operation.

Summary of the invention

One of the objects of this invention is to provide guidance apparatus for supporting a device in close proximity to the inner wall of a tapered stack.

Another of the objects of this invention is to provide guidance apparatus for supporting a camera vehicle in close proximity to the inner wall of a tapered stack for photographic purposes.

I have discovered that the foregoing objects can be attained by hinging a thrust rod for rotation in a vertical plane to the midpoint of a wheeled beam supporting the device or camera vehicle, the free end of the thrust rod engaging the wall of the stack above and opposite the wheels of the wheeled beam, whereby gravitational forces on the thrust rod resulting in a component urging the wheels of the wheeled beam into continuous engagement with the stack wall, thereby maintaining the device or camera vehicle in continuous proximity to the stack wall.

Brief description of the drawing

FIGURE 1 represents a view in elevation of the present invention in operative position within a tapered stack.

FIGURE 2 represents a view in plan of the present invention in operative position within the tapered stack.

FIGURE 3 represents an enlarged perspective view of the present invention.

Description of the preferred embodiment

In the preferred embodiment, the present invention is employed for the purpose of supporting a camera vehicle 1 in close proximity to the inner wall 2 of a tapered stack 3.

The details of the camera vehicle 1 are not important although, for a full understanding of the environment of the present invention, it will be noted that camera vehicle 1 comprises an elongated heat insulated housing 4 enclosing a camera (not shown), and having a heat reflective and heat resistant glass covered aperture 5 through which the camera may photograph portions of inner wall 2. Suitable lighting means (not shown) may be mounted to housing 4.

Beam 6 supports camera vehicle 1 by means of cable 7. Wheels 8 are rotatably mounted to the ends of beam 6, preferably obliquely and at such an angle that the said wheels 8 are perpendicular to those portions of inner wall 2 contacted by the wheels 8.

A substantially rigid thrust rod 9, of length greater than the maximum inside horizontal dimensions of the stack 3, in the area to be photographed by the camera, is pivotally mounted to the center of beam 6, between brackets 10, so as to be capable of rotation in a vertical plane and restrained against any substantial movement in other directions.

Beam 6, with camera vehicle 1 suspended therefrom, is raised and lowered in stack 3 by means of cable 11 secured to the center of beam 6. Cable 11 and cable 7 may be parts of the same cable extended through and clamped to collar 12 in beam 6.

In operation, cable 11 is paid out to lower beam 6, and the camera vehicle 1 suspended therefrom, down the stack 3, with wheels 8 engaging and rolling down walls 2 of the said stack, and with the free end 13 of thrust rod 9 sliding down the opposite side of stack 3 and always at a higher elevation within stack 3 than the pivoted end 14 of said thrust rod 9. Thrust rod 9 has sufficient mass to produce a force component urging the beam 6 into continuous engagement, through wheels 8, with the wall 2 of stack 3. In this manner, camera vehicle 1 will always be in close proximity to wall 2, and satisfactory pictures thereof taken.

When it is desired to retrieve beam 6 and the camera vehicle 1 suspended therefrom, the free end 13 of thrust rod 9 may be raised clear of wall 2 by means of cable 15, and cable 11 taken in to remove beam 6 and camera vehicle 1 from stack 3.

Alternatively, and in lieu of cable 15, and in view of the fact that thrust rod 9 may be a fairly slender length of pipe, beam 6 and camera vehicle 1 may be retrieved from stack 3 simply by pulling up on cable 11 with such force as to bend or collapse thrust rod 9, after which the beam 6 and camera vehicle 1 can be removed simply by further taking in of cable 11.

I claim:
1. In association with first and second spaced opposed walls, said first wall being inclined downwardly and away from said second wall, apparatus for lowering a device between said first and second walls in continuous proximity to said first wall, said apparatus comprising:
  (a) a horizontal member,
  (b) means adapted to mount said device to the midpoint of said horizontal member,
  (c) a pair of wheels rotatably mounted to opposite ends of said horizontal member and adapted to rollably engage said first wall,
  (d) an elongated substantially rigid member having a first end and a second end, said elongated rigid member being of length greater than the maximum horizontal distance between said first and second walls,

(e) means pivotally mounting the first end of said elongated rigid member to the midpoint of said horizontal member for rotation in a vertical plane perpendicular to the longitudinal axis of said horizontal member,
(f) the second end of said elongated rigid member being adapted to slidably engage the second wall at an elevation above the elevation of the first end of said elongated rigid member, said elongated rigid member having sufficient mass to urge said wheels against said first wall,
(g) whereby said elongated rigid member exerts a continuous thrust against said horizontal member in a direction towards said first wall to continuously maintain said wheels in rolling engagement with said first wall.

2. Apparatus as in claim 1, said first and second walls being opposite sides of the inner wall of a tapered stack of circular cross-section and of diameter decreasing in an upward direction, said apparatus further comprising:
(h) said wheels being rotatably mounted to said horizontal member obliquely to the longitudinal axis of said horizontal member, whereby each wheel is perpendicular to the portion of the inner wall engaged by said wheel.

3. Apparatus as in claim 1, further comprising:
(h) said elongated rigid member being restrained against any substantial movement relative to said horizontal member in directions other than a vertical plane.

References Cited
UNITED STATES PATENTS

| | | | |
|---|---|---|---|
| 2,667,109 | 1/1954 | Piety | 95—11 |
| 3,279,085 | 10/1966 | Reinhart | 95—11 |

EVON C. BLUNK, Primary Examiner

H. C. HORNSBY, Assistant Examiner

U.S. Cl. X.R.

95—11; 104—138